(12) United States Patent
Ward

(10) Patent No.: US 6,937,611 B1
(45) Date of Patent: Aug. 30, 2005

(54) MECHANISM FOR EFFICIENT SCHEDULING OF COMMUNICATION FLOWS

(75) Inventor: Kenneth A. Ward, Shrewsbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/553,966

(22) Filed: Apr. 21, 2000

(51) Int. Cl.$^7$ .............................................. H04J 15/00
(52) U.S. Cl. ...................... 370/462; 370/408; 370/412; 370/449
(58) Field of Search ................................ 370/462, 382, 370/408, 443, 450, 539, 329, 346, 412–416, 370/429, 449, 455; 710/36, 39, 42; 711/149, 711/145

(56) References Cited

U.S. PATENT DOCUMENTS

| | | | |
|---|---|---|---|
| 4,271,468 A * | 6/1981 | Christensen et al. | .......... 710/39 |
| 6,378,036 B2 * | 4/2002 | Lerman et al. | ............. 711/112 |
| 6,463,484 B1 * | 10/2002 | Moss | .......................... 710/36 |

FOREIGN PATENT DOCUMENTS

| | | |
|---|---|---|
| EP | 1 126 668 | 8/2001 |
| WO | 98/45976 | 10/1998 |

OTHER PUBLICATIONS

"Next Generation I/O: A New Approach to Server I/O Architectures," A Technical White Paper, Aberdeen *Group*, Inc., Feb. 1999, 13 pages.

"The Future I/O Alliance and Architectural Strategy," The Future I/O Developers Forum, Preserving Innovation, Oct. 27, 1999, pp. 1-6.

"Service Displines for Guaranteed Performance Service in PAcket-Switching Networks," H. Zhang, Proceedings of IEEE, vol. 83, No. 10, pp. 1374-1396, Oct. 1995.

"Traffic Scheduling in PAcket-switched Networks: Analysis, Design, and Implenentation," Dimitrios Stiliadis, Univ. of California Santa Cruz, 1996, pp. 1-235.

International Search Report for PCT/US 01/13105, mailed Feb. 15, 2002.

* cited by examiner

Primary Examiner—Alpus H. Hsu
Assistant Examiner—Justin M Philpott
(74) Attorney, Agent, or Firm—Robert C. Kowert; Meyertons, Hood, Kivlin, Kowert & Goetzel, P.C.

(57) ABSTRACT

A system for servicing communication queues may include memory configured to store a hierarchical channel map having a plurality of levels wherein each bit of the lowest level is mapped to a different one of a plurality of communication channels and wherein each bit of each higher level is mapped to a group of bits at the next lower level. The system may include a host adapter configured to maintain the hierarchical bitmap wherein each bit at the lowest level is set if the channel to which it is mapped has a pending communication request and is cleared if not. Each bit of each higher level is set if at least one bit is set in the lower level group to which is mapped and cleared if not. The host adapter may be configured to examine the hierarchical bitmap in order to determine a next one of the communication channels to service. At each level of the hierarchical channel map a service mask may be provided to track which bits have already been traversed at that level. Multiple such service masks may be provided at each level to support different service classes.

38 Claims, 8 Drawing Sheets

Class 1 bit map 0x0000000000000003 (channel numbers 1-2048)
Class 2 bit map 0x00000000000000FC (numbers 2049-8K)
Class 3 bit map 0x0000000000000F00 (8K-12K)
Class 4 bit map 0x8000000000000000 (63K-64K)

Service Array

MECHANISM FOR EFFICIENT SCHEDULING OF COMMUNICATION FLOWS

BACKGROUND OF THE INVENTION

1. Field of the Invention

This invention relates to servicing queues of communication requests in computing systems. For example, system area network systems may support hundreds or thousands of I/O channels which share a network fabric or other communication link. This invention relates to how the bandwidth of the fabric or link may be shared amongst the communication channels.

2. Description of the Related Art

Computer systems I/O performance has become critical in today's applications. Applications such as web servers, internet based e-commerce, online transaction processing, mail and messaging, and other internet, intranet and extranet applications are extremely I/O intensive. A coinputer's processor may need to frequently communicate with storage systems, network cards, and even other processors over limited I/O connections. The I/O portion of computer systems is rapidly becoming a bottleneck on performance. Recently, new I/O architectures have been proposed to improve upon the I/O bottleneck problem. Some of these proposals include system area network solutions employing numerous I/O channels sharing a switched interconnect fabric. Some recent I/O architecture proposals include Future I/O and NGIO which have merged into System I/O which is now controlled by the InfiniBand Trade Association.

A common theme in modern I/O architectures is the need to service many communication requests to many different communication channels that are sharing a limited total bandwidth. One problem is how to divide or allocate the available bandwidth amongst the various communication requests. Turning now to FIG. 1, a computing system is shown in which numerous communication channels are supported. A typical computing system may include multiple CPU's 102 coupled to a host bus 103. A system memory 104 and memory controller 106 may also be coupled to host bus 103 and shared by CPU's 102. Alternatively, or additionally, each CPU 102 may have its own local memory and memory controller. A host channel adapter 108 couples the host bus elements to various I/O resources. Host channel adapter 108 may be integrated in a single component with memory controller 106. A switch 110 may be employed to select amongst various I/O channels to connect to I/O devices 112. Switch 110 may include multiple switches arranged in parallel or in a hierarchical manner. Each I/O device or subsystem 112 may include a target channel adapter for interfacing to the I/O fabric 114.

The host channel adapter 108 serves to decouple CPU's 102 from I/O communications. Various applications executing on CPU's 102 may make I/O or communication requests to host channel adapter 108 for various I/O resources. Host channel adapter 108 services communication requests and returns the results to the requestor. Requests to the same channel may be placed in a queue awaiting service. Host channel adapter 108 services the communication requests within the constraints of the limited bandwidth available through switch 110 and I/O fabric 114. FIG. 1 is merely an illustration of one type of system employing multiple communication channels sharing a limited bandwidth. The problem of providing service for numerous communication channels can be found in many different architectures and computing applications.

Turning now to FIG. 2, a more conceptual illustration of queuing communication requests for different communication channels is provided. A system may be configured to provide for up to a maximum number of communication request queues 122. For example, a system may support up to 64K queues. Each queue establishes a sequence of operations to be performed on a particular communication channel. At any given time each queue may or may not have operations to execute. The servicing of the communication queues 122 may be performed by a host or local channel adapter 124. The local channel adapter 124 decides which request queue 122 is serviced over its communication channel through the communication fabric 126 to the appropriate remote channel adapter and communication device 128. Since the bandwidth of the communication fabric 126 is limited, the local channel adapter 124 must decide how best to distribute the limited bandwidth amongst the communication request queues 122. It is typically desirable that all queues be serviced in a fair fashion. Fairness may mean equal access to a given amount of bandwidth based upon a particular service class. Different service classes may be allocated different amounts of total bandwidth.

When a number of communication channels share bandwidth of physical media, as illustrated in FIG. 2, each channel may be viewed as a queue with traffic/packets to be sent over the media or fabric. Typically the number of channels greatly exceeds the number of physical media paths that are shared by the physical devices to which communication requests are being made. In some systems it may be desirable that each channel should get equal access to physical media bandwidth and that bandwidth should be equally shared amongst all the channels.

On solution to allocating bandwidth amongst the channels is a round robin, one message per channel allocation. However, a message based allocation may unfairly favor requesters with larger messages. For example, those channels with requests for large amounts of data would get more bandwidth than those channels with requests for smaller amounts of data.

Therefore, it would be desirable to have a more fair bandwidth allocation than a pure one message per channel mechanism. It may also be advantageous to group classes of channels together in order to vie for gross amounts or percentages of media bandwidth. This combination of channel grouping into classes and bandwidth allocation based on class may provide for differing levels of service.

Another problem that must be addressed when servicing multiple communication channels is how to keep track of which channels need serviced and which channel should be serviced next. One solution is to provide a block of memory in which a single bit maps to a channel. If the bit for a particular channel is set then it indicates that the corresponding channel has a pending request. After a channel is serviced, this block of memory may be examined to determine the next channel that has a pending request. This solution requires an amount of memory equal to the maximum number of channels supported. For example, if 64K channels are supported then 64K bits of memory are needed to indicated the status of each channel. One drawback of this solution is that much time must be spent scanning the memory for the next channel that has a pending request. For example, if the memory can be searched 32 bits at a time then the worse case search time would be 2K memory accesses (64K bits divided by 32 bits).

Alternatively, linked list structures may be used to indicate the next channel requiring service. The linked list solution avoids the search time inefficiencies of the previously described solution since the next channel to be service may be immediately indicated by the linked list structure. However, a linked list solution requires much more memory to implement. The first described solution in which one bit per channel is used to indicate whether or not a request is pending in a channel requires in the order of N bits of memory for N channels. However, a linked list solution requires memory in the order of N*logN. For example, for a 64K channel system a linked list solution would require on the order of 128 kilobytes of memory to maintain a list of active queues if the list was not sparse (approximately 16 times as much memory as the one bit per channel solution).

Thus, while a linked list structure may be time efficient for determining the next queue to be serviced, it is not memory efficient. In contrast, the one bit per channel solution may be somewhat more memory efficient, but may not be time efficient for determining the next queue to be serviced. Thus, it would be desirable to have a solution for determining which queue is to be serviced that is efficient in both time and memory.

Thus, servicing multiple communication channels evokes numerous problems. It is desirable to select the next channel or queue for servicing in a timely fashion. It may also be desirable to select the next channel or queue for servicing in a fair manner while providing for different service classes. It may also be desirable to perform the channel/queue selection using a minimal or reasonable amount of resources (e.g., memory).

SUMMARY OF THE INVENTION

Many of the problems discussed above may be alleviated by employing a hierarchical channel map or bitmap to determine when communication channels should be serviced. Each bit in a higher level in a hierarchical channel map indicates that at least one bit is set in a corresponding group of bits in the next lower level of the hierarchical channel map. Each higher level bit may provide this indication for a fixed sized group of lower level bits. At the lowest level of the hierarchical channel map, each bit maps to one of the communication channels. If a communication channel has a pending request, then the corresponding bit is set in the lowest level. If a communication channel no longer has any pending requests, its corresponding bit is cleared at the lowest level. Changes to the lowest level of the hierarchical channel map may be propagated up the hierarchy so that each bit at a higher level reflects whether or not any of the bits in the corresponding lower level group are set.

At each level of the hierarchical channel map a service mask is provided to track which bits have already been traversed at that level. A service mask may be cleared once all bits within a current bit group have been traversed. In an alternate embodiment, a different service mask may be provided per level and per service class to allow channels to be divided into different service classes. Sections of channels may be assigned to different service classes according their grouping at the highest level of the hierarchical channel map. A service array may indicate an order in which each service class receives service bandwidth where the order indicated by the service array is continually repeated. For the current service class indicated by the service array, the hierarchical channel map is examined according to the positions indicated by the service masks for the current service class.

In one embodiment a system for servicing a plurality of communication channels may include a host adapter configured to service communication requests wherein the host adapter supports up to a maximum number of communication channels for servicing the requests. A communication fabric may be configured to provide a limited bandwidth to the host adapter for servicing the communication requests. A memory may be configured to store a lowest level of a hierarchical channel map. The lowest level may include one bit for each communication channel wherein each bit of the lowest level is set to indicate that the communication channel to which it is mapped has a pending communication request and is cleared if there is no pending communication request. Memory may also be configured to store a top level of the hierarchical channel map. Each bit of the top level maps to a section of the lowest level and is set if at least one bit in the section of the lowest level to which it is mapped is set and is cleared if not of the bits in the lowest level section to which it is mapped are set. The host adapter may determine a next channel to be serviced by examining or searching the hierarchical channel map.

In an embodiment, a method for servicing a plurality of communication channels may include selecting a set bit in a top level of a hierarchical channel map wherein the set bIt indicates a group of bits in a next level of the hierarchical map to be examined. The method may include examining in each of one or more intermediate levels of the hierarchical map only a group of bits as indicated by the set bit selected in the previous level, and selecting a set bit from each examined group. A lowest level may be examined wherein only the group of bits indicated by the previous intermediate level need be examined. The method may include selecting a bit from the examined lowest level group wherein the selected lowest level bit indicates one of the communication channels to be serviced.

Generally speaking a system for servicing communication queues may include memory configured to store a hierarchical channel map having a plurality of levels wherein each bit of the lowest level is mapped to a different one of a plurality of communication channels and wherein each bit of each higher level is mapped to a group of bits at the next lower level. The system may include a host adapter configured to maintain the hierarchical bitmap wherein each bit at the lowest level is set if the channel to which it is mapped has a pending communication request and is cleared if not. Each bit of each higher level is set if at least one bit is set in the lower level group to which is mapped and cleared if not. The host adapter may be configured to examine the hierarchical bitmap in order to determine a next one of the communication channels to service.

BRIEF DESCRIPTION OF THE DRAWINGS

Other objects and advantages of the invention will become apparent upon reading the following detailed description and upon reference to the accompanying drawings in which.

Figure 1:
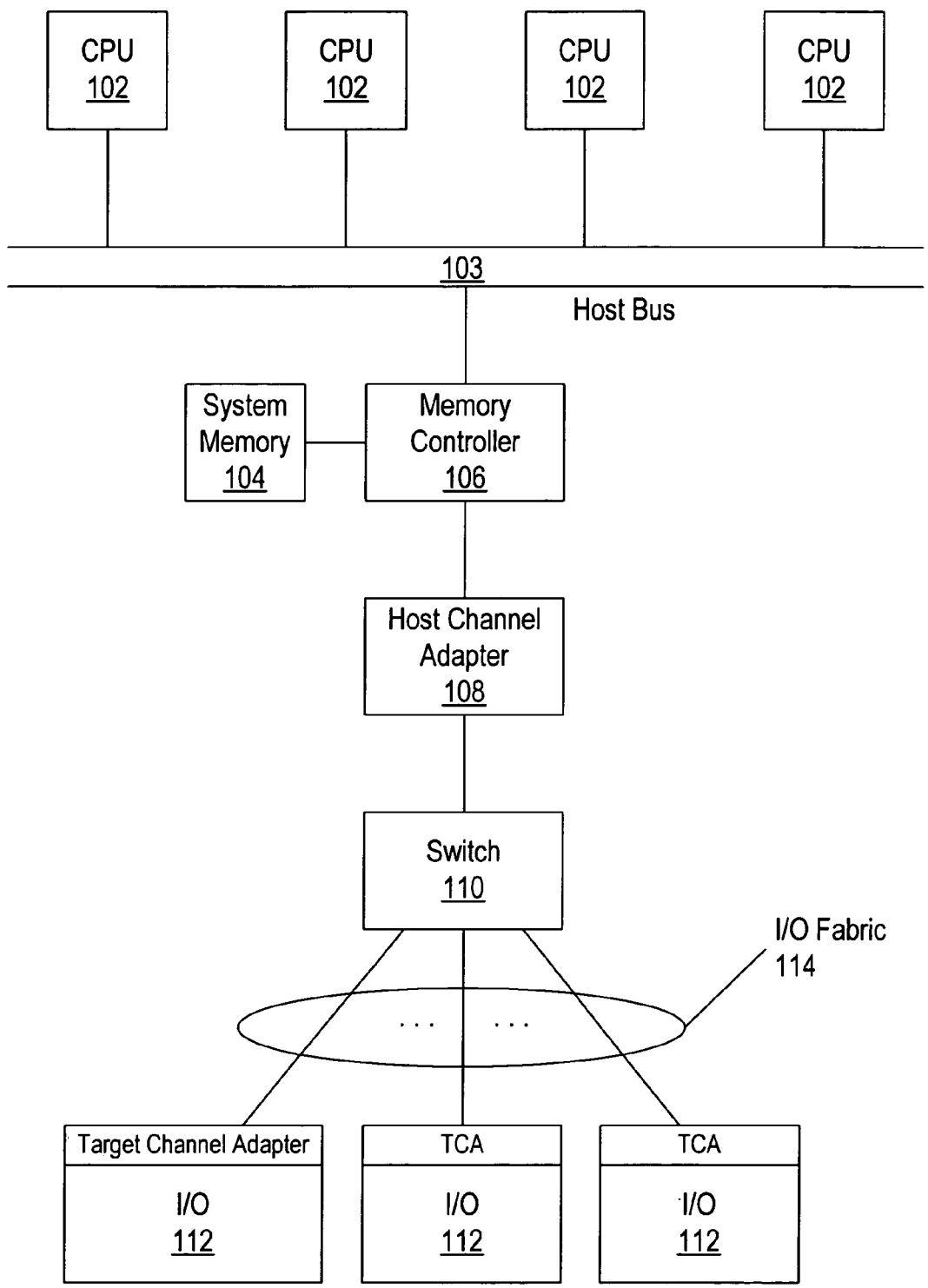
FIG. 1 is an illustration of a computing system in which numerous communication channels are supported.
Figure 2:
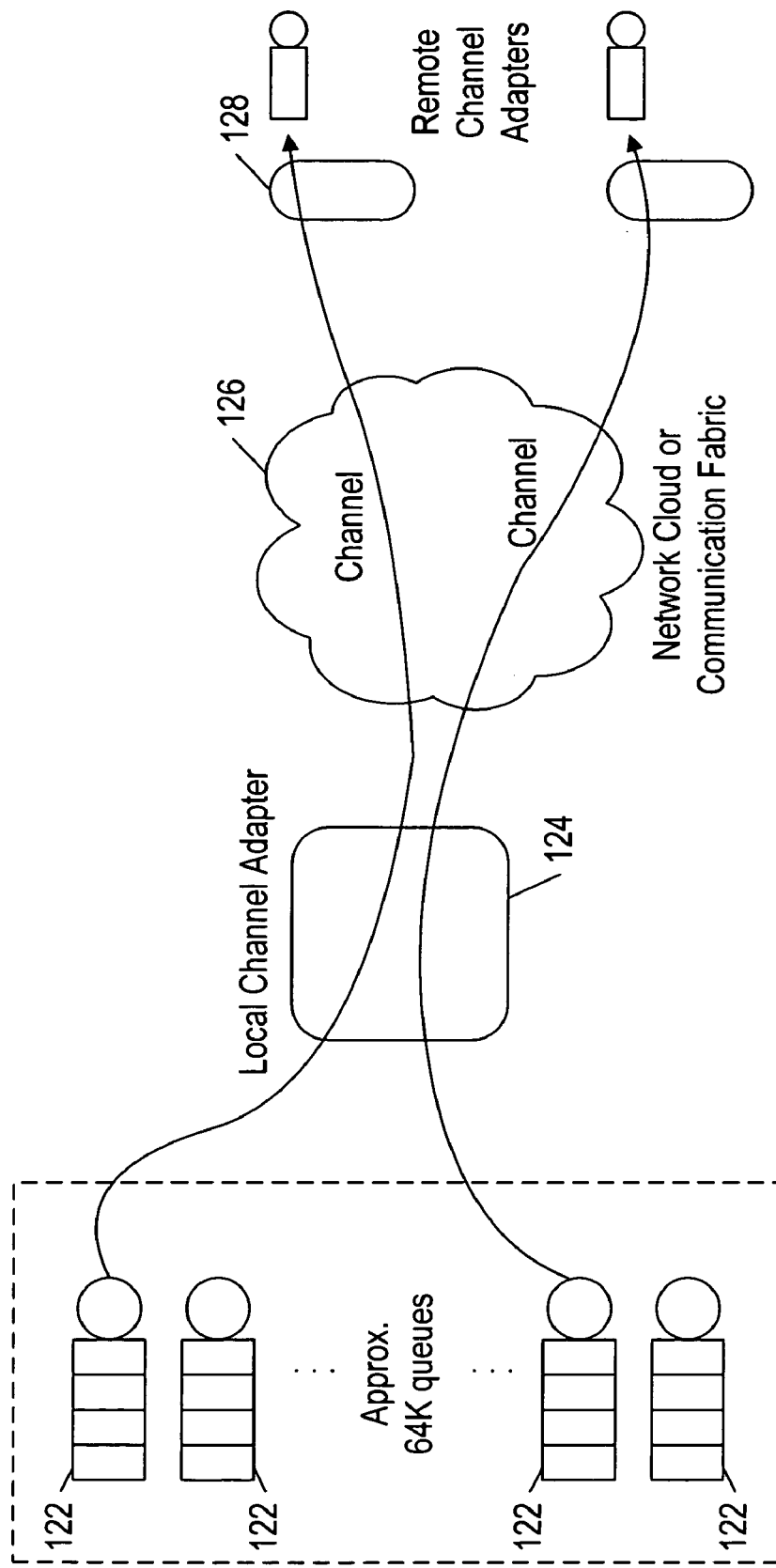
FIG. 2 is a conceptual illustration of queuing communication requests for different communication channels.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 3:
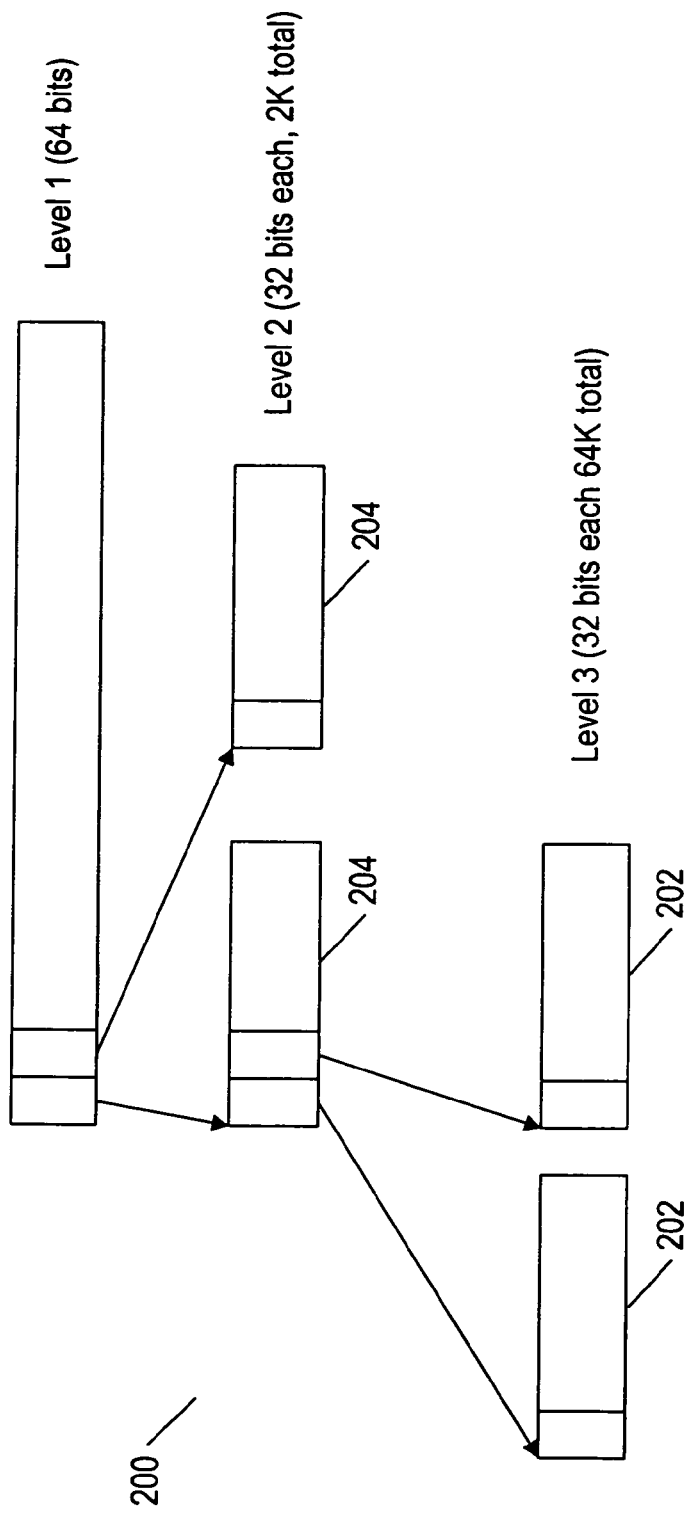
FIG. 3 is an illustration of a hierarchical bitmap for indicating which ones of a plurality of communication channels has a pending communication request needing service.

Turning now to FIG. 3, a hierarchical bitmap 200 is illustrated for indicating which ones of a plurality of communication channels has a pending communication request needing service. The embodiment illustrated in FIG. 3 supports up to 64K communication channels. However, any number of communication channels may be supported by the hierarchical bitmap mechanism described herein. In the 64K channel example of FIG. 3, the lowest level (level three) of the hierarchical bitmap 200 includes 64K bits where each bit represents whether or not a corresponding channel requires service. For example, if a particular bit is set in level three of the hierarchical bitmap 200 then the corresponding channel has a pending communication request. If a particular bit is cleared in level three of hierarchical bitmap 200, then the corresponding communication channel does not have a pending communication request. The status indicating bits of level three are divided into multiple channel groups 202. In one example of hierarchical bit map 200, each channel group 202 includes 32 bits representing 32 different channels. Thus, for the 64K channel example, level three would include 2K channel groups 202 (64K bits, each one mapping to a different channel). A 32-bit size for channel groups 202 is merely one example. Different sizes may be employed for channel groups 202. It may be preferable that channel groups 202 are sized according to the maximum number of bits that can be read and written by a single memory access.

The next higher level (level two) of hierarchical bitmap 200 includes one bit for each channel group 202 of the next lower level (level three). The bits of level two are also divided into 32-bit groups 204. Thus, for the example in FIG. 3, level two would include 2K bits (64K/32), one for each of the 2K channel groups 202 of level three. Bit 1 of level two may map to bits 1–32 of level three, bit 2 of level two may map to bits 33–64 of level three, etc. Thus, level two includes 64 level two groups 204. Each bit in level two of the hierarchical bitmap 200 indicates whether or not a bit in a corresponding channel group 202 of level three is set. For example, if a particular bit is set in level two then that indicates that at least one bit of the 32 bits in the corresponding level three group 202 is set. Preferably the level two groups 204 are divided into a group size that may be read or written by a single memory or register access.

The top level (level one) of hierarchical bitmap 200 includes one bit corresponding to each of the level 2 groups 204. In the example of FIG. 3, level one would include 64 bits, each one corresponding to a different one of the 64 level 2 groups 204. If a particular bit is set in level one, then that indicates that one of the bits in the corresponding level 2 group 204 is also set, which in turn indicates that at least one bit is set in the level three channel group 202 corresponding to the bit set in the level 2 group 204. Note that while the hierarchical bitmap 200 in FIG. 3 has been illustrated with each higher level bit of the bitmap hierarchy representing 32 bits at a lower level, different group sizes may be employed and the group sizes may differ between levels. Also, while three levels have been illustrated for the example of FIG. 3, different numbers of levels (e.g., two, or more than three) may also be employed.

Note that the hierarchical bitmap 200 requires only slightly more memory than a flat memory map of the communication channels. For example, for 64K channels a flat (single level) map would require 64K bits of memory. A hierarchical bitmap, such as in FIG. 3, would require 64K bits at level three plus 2K bits at level two plus 64 bits at level one. Thus, the hierarchical bitmap would require approximately 8.25 kilobytes of memory compared to 8 kilobytes for the flat map. Therefore the hierarchical bitmap of FIG. 3 requires only slightly more memory than a flat map solution and still far less memory than a linked list solution.

The hierarchical bitmap also provides a fast mechanism for locating the next channel requiring service. Assuming that 32 bits are accessed at a time, the worst case number of memory accesses in one embodiment to the hierarchical bitmap for the 64K bitmap example of FIG. 3 is four—two at the first level to locate a set bit out of the 64 bits of the first level followed by one access to the level two group 204 corresponding to the set bit of level one, followed by one access to the channel group 202 of level three corresponding to a set bit of the accessed level two group 204. In other embodiment in which a current lowest level is first read to find a next set bit, two additional reads may be required.

In a preferred embodiment, the level one bits may be stored in one or more registers as oppose to random access memory so that level one accesses may be performed much faster. However, the exact memory implementation is not critical and, if resources permit, all levels may be stored in a register file, or on chip memory, or SRAM, or another fast memory, or any other type of memory.

After a channel has been serviced, the bit corresponding to that channel in level three is cleared if the channel does not have any more pending requests. If the clearing of a bit in a channel group 202 results in all bits of that group cleared, then the corresponding bit in level two must also be cleared, which may also require a bit in level one being cleared if all the bits in the level two group are cleared. Similarly, as bits are set in level three to indicate pending channel requests, corresponding bits in level two and level one may need to be set. The clearing and setting of bits throughout the hierarchical bit map may be referred to as maintaining the validity of the hierarchical bitmap. However, at the worst case only three reads and three writes are needed to set a low level bit and its corresponding hierarchical bits or to clear a bit. For example, when a communication request has been serviced and no further requests are pending for that channel, then the corresponding channel group 202 is read and modified to reflect the now clear channel. If no other bits are set in the channel group 202, then the corresponding level two group 204 is read and modified to indicate that the level three channel group is all clear. If no other bits are set in the corresponding level two group 204, then the corresponding portion of level one is read and modified to indicate that the level two group is all clear. Note that this sequence of three reads and three writes to set or clear a bit is the worst case. In many situations only one or two pairs of reads and writes will be needed to set or clear a bit. This is because when a bit is set or cleared other bits in that group may also be set so that no change is needed at the next higher level.

In one embodiment, the hierarchical bitmap is traversed in a round robin manner to ensure fairness in bandwidth allocation amongst the channels. To further ensure fairness, channel service may not be based on message size, but instead upon a finer fixed granularity. This is to prevent channel requests with a large message size from receiving a higher portion of bandwidth than channel requests with a small message size. A smaller service unit, such as a cell, frame, flit or quantum, may be used for the channel service size. The terms quantum or service unit will be used hereinafter to indicate the access time or size allowed to service each channel. In other words, each channel with a pending request is allowed to access the interconnect fabric or communication media for one quantum before it must relinquish the communication media to another channel. In a round robin protocol, a given channel is not allowed repeat access to the communication media until all other channels with pending requests have had access to the media.

Figure 4:
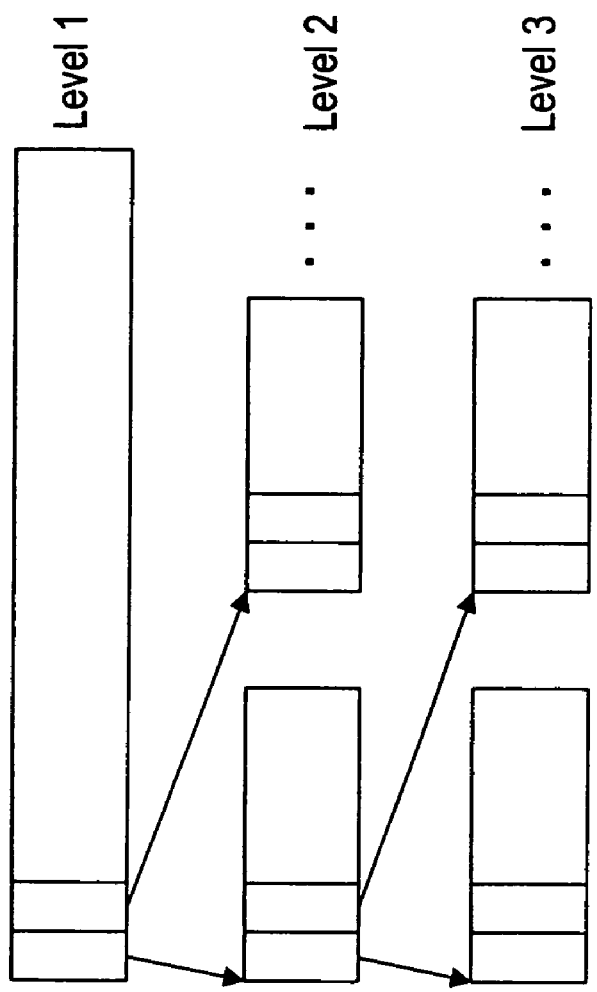
FIG. 4 is an illustration of a hierarchical bitmap such as illustrated in FIG. 3 along with a service mask register for each level of the hierarchical bitmap.
Figure 4:
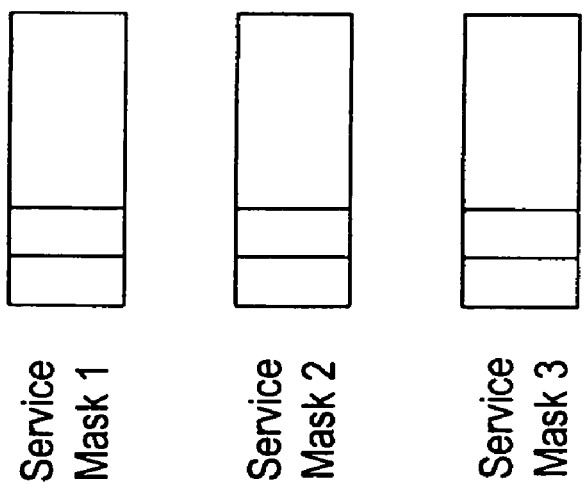

Turning now to FIG. 4, a hierarchical bitmap such as illustrated in FIG. 3 is shown along with a service mask register for each level of the hierarchical bitmap. The service mask registers are used to keep track of which bits have been traversed at a given level for round robin servicing. For 32-bit hierarchical bitmap groups, each service mask may be a 32-bit bitmask or a 5-bit position pointer. Each service mask indicates the position of the most recently traversed bit for an active group in that level. When the active group in a given level is examined to determine the next bit indicating that service is required, the bits are examined starting at the next highest bit in the group from the position indicated by the service mask for that level. When the end of a group is reached, the service mask is cleared and the next group is traversed from the beginning.

Figure 5:
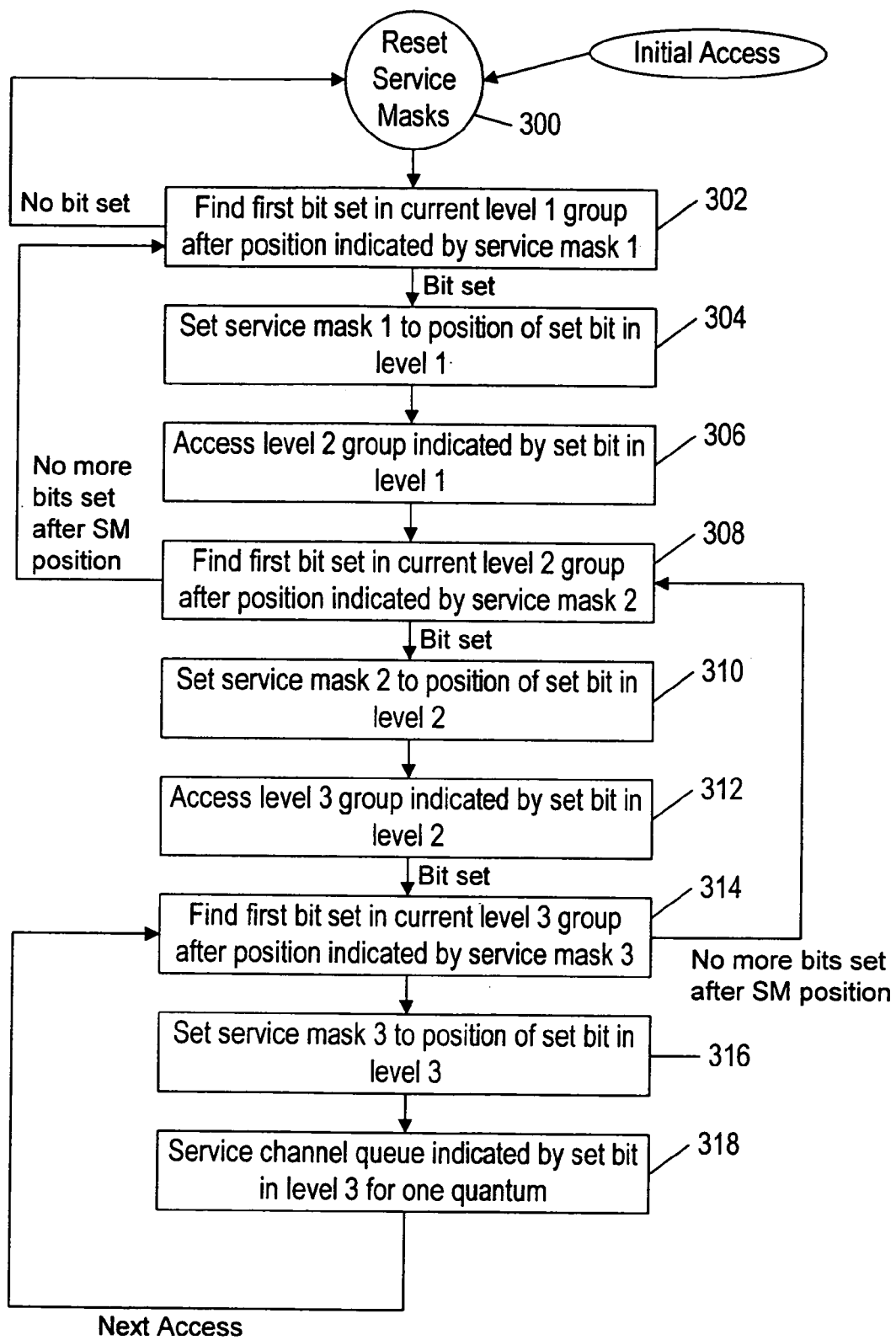
FIG. 5 illustrates a flow diagram of a method for locating a next channel to be serviced.

Turning now to FIG. 5, one example of a method for locating the next channel to be serviced is illustrated. Upon an initial access all service masks are cleared, as indicated at 300. The first set bit is located in the top level of the hierarchical bitmap, as indicated at 302. Service mask one is then updated to indicate the position of the first set bit in level one of the hierarchical bitmap, as indicated at 304. The level two group indicated by the bit set in level one is then accessed, as indicated at 306. The accessed level two group is then examined to locate a set bit, as indicated at 308, and the level two service mask is updated to indicate the position of a set bit, as indicated at 310. Then the level three group indicated by the set bit in level two is accessed, as indicated at 312, and the first set bit is located in the level three group, as indicated at 314. The level three service mask is updated to indicate the position of the set bit in level three of the hierarchical bitmap, as indicated at 316.

The corresponding channel queue indicated by the identified set bit in level three is then serviced for one quantum, as indicated at 318. For subsequent accesses the current level three hierarchical bit group is examined to locate the next set bit after the position indicated by the level three service mask, as indicated at 314. If no more bits are set after the position indicated by the level three service mask, then the current level two group is examined to locate the next set bit after the position indicated by the level two service mask, as indicated at 308. If no more bits are set in the level two group, then the level one group is examined to find the next set bit, as indicated at 302.

Figure 6:
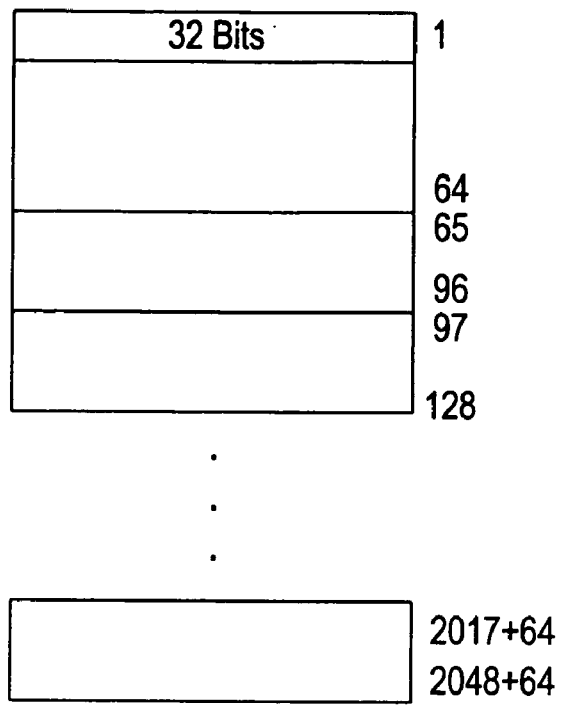
FIG. 6 is an illustration of a memory map showing how a hierarchical bitmap may be mapped into a block of memory.

Turning now to FIG. 6, a memory map is illustrated showing how a hierarchical bitmap may be mapped into a block of memory. The memory for storing the hierarchical bitmap may be part of the system memory of a computer system or may be a dedicated memory. The memory map illustrated in FIG. 6 assumes that the top level of the hierarchical bitmap is stored in one or registers of a host adapter or other controller. Thus, only level two and three of the hierarchical bitmap are mapped to memory. FIG. 6 illustrates an example of a 64K channel hierarchical bitmap, such as shown in FIG. 3. Each memory location 1 through 64 stores one of the level two groups of the hierarchical bitmap. Each memory location is 32 bits wide. The next 2K memory locations store the level three channel bit groups. Each address holds a 32-bit level three bit group that corresponds to a level two bit.

Figure 7:
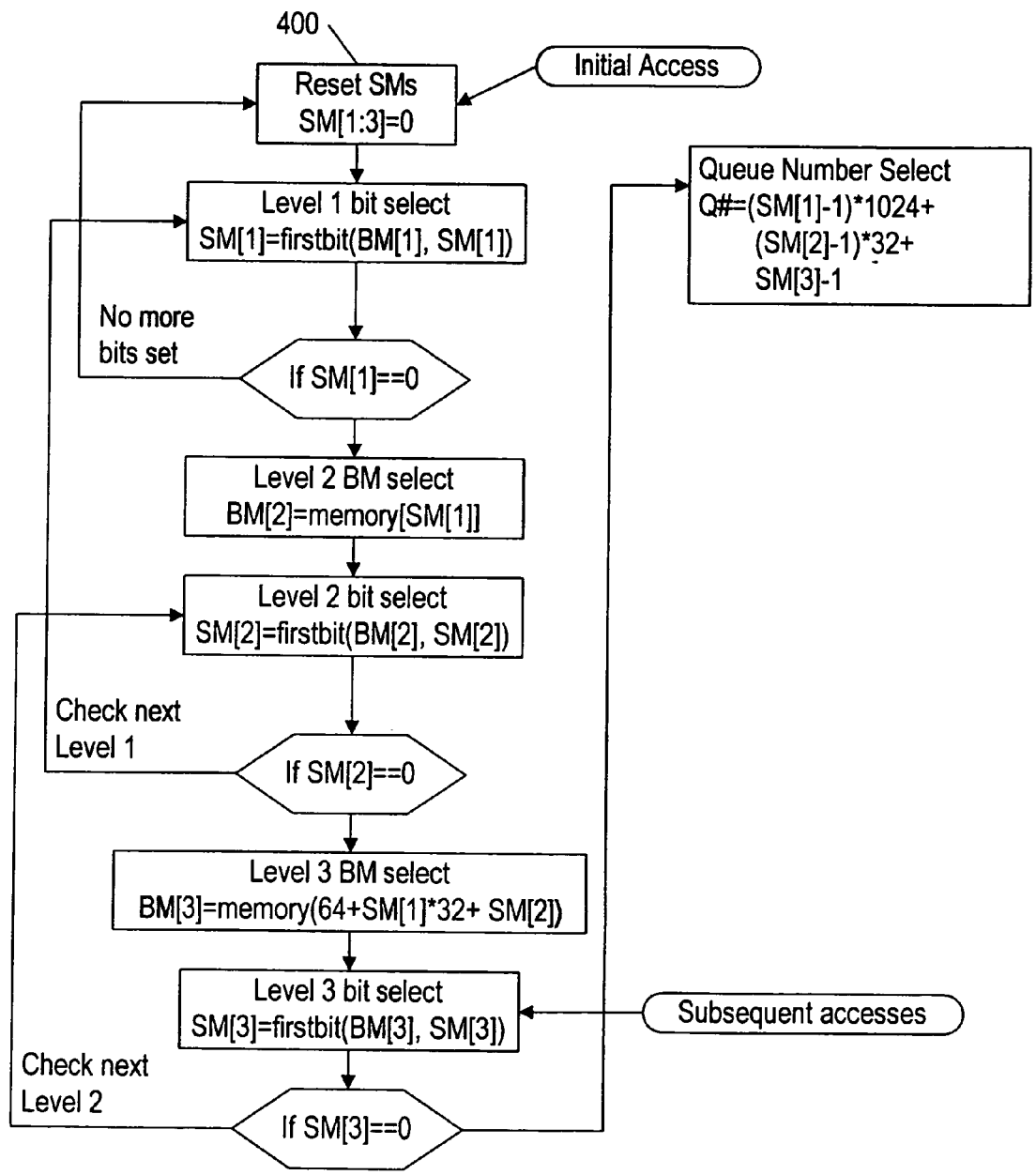
FIG. 7 illustrates a pseudo-code flowchart showing a method for locating a next channel queue to be serviced.

Turning now to FIG. 7, a pseudo-code flowchart is illustrated showing a method for locating a next channel queue to be serviced. The method is similar to that illustrated in FIG. 5, except it is shown in pseudo-code and corresponds to the memory map of FIG. 6. SM[1:3] correspond to the service mask registers for levels 1–3. SM[1] holds values from 1 to 64 corresponding to a bit set in the level one bit mask group. SM[2:3] holds values from 1–32 for the current working level two and level three bit positions. BM [1:3] are the current working level one to three hierarchical bit mask groups. The function firstbit(BM, SM) is a function that returns the first bit set in the BM, after the bit position indexed by the SM. A zero indicates that no bits are set. The function memory(A) returns the value and memory at location A. The memory holds the hierarchical bitmaps, e.g., as shown in FIG. 6.

The hierarchical bitmap mechanism has been described in regard to FIGS. 4–7 as employing a round robin servicing mechanism in which each channel receives one quantum of access service (if needed) for each round through the hierarchical bitmap. An additional mechanism may be employed to provide for different service classes in which some channels may receive a larger portion of the communication media bandwidth than other channels. This may be desirable for different service priorities or differing delay variabilities. It may be that certain channels must be guaranteed a higher portion of bandwidth, or certain channels while not necessarily requiring a large amount of bandwidth may require a very low latency between access, such as in real-time applications. Thus, it may be desirable to provide for different service classes among the channels.

A mechanism may be provided to group the channels into different service classes according to the top level channel groupings of the hierarchical bitmap. As can be seen in FIG. 3, each bit at the top level (level one) bitmap represents a fixed set of 1,024 channels, for the 64K channel example. This grouping may be taken advantage of to group channels into different service classes, 1,024 channels at a time. In other words, channels may be divided into different service classes according to their grouping at the top level of the hierarchical bitmap. In the 64K channel example, this would provide for up to 64 different service classes. In practice, fewer service classes may be needed. Therefore, a lesser number of service classes may be provided for, such as eight.

In one embodiment, a service class mask may be used for each service class to indicate which of the 1,024 channel sections are members of that service class. For the example of eight service classes for the 64K channel example, this would require eight 64-bit service class masks. Each one of the eight 64-bit service class masks would indicate which of the 1,024 channel chunks are members of that service class. Note that other structures may be used besides mask registers to indicate which channel sections are members of a particular service class.

Figure 8:
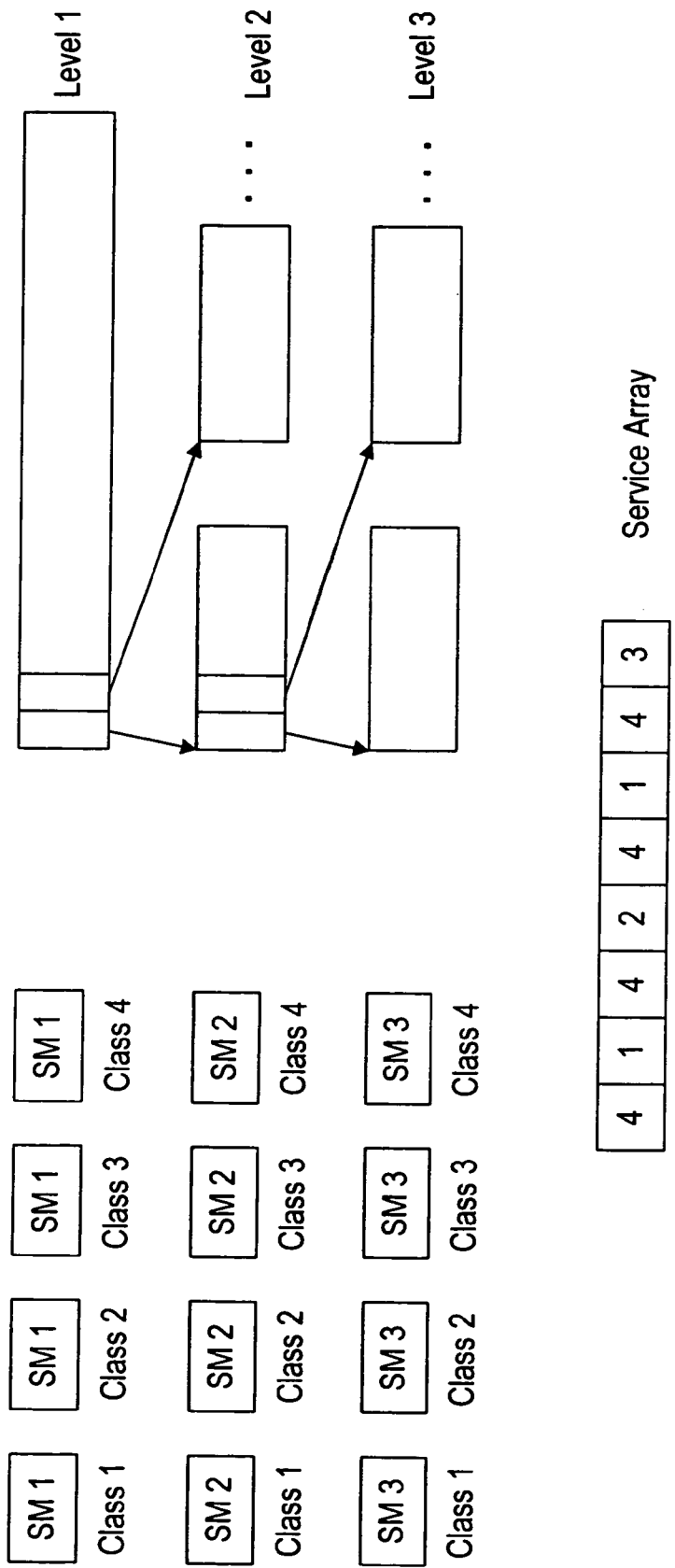
FIG. 8 is an illustration of a hierarchical bitmap such as illustrated in FIG. 3 along with a service mask register for each of four service classes and for each level of the hierarchical bitmap.

In addition, service mask registers, such as shown in FIG. 4, may be duplicated for each service class, as indicated in FIG. 8. FIG. 8 illustrates four different service classes. A service array (also shown in FIG. 8) is used to determine how the service classes are serviced. A service array includes X number of entries, where X determines the bandwidth granularity that may be assigned to different service classes. Each entry in the service array indicates the particular service class that should be serviced during the current quantum. At the end of the current quantum, the next entry in the service array is visited. When the end of the service array is reached, the order is repeated from the beginning of the service array. Thus, the service array may be viewed as a circular indication of the order in which service classes receive a quantum of bandwidth. For example, if a service array contains 64 entries the bandwidth may be partitioned into 1/64 divisions (approximately 1.5% of the total bandwidth). Each time a service class is indicated in the service array, it receives and additional 1.5 percent of the bandwidth. The service array and the mapping of channel sections to service classes may be configured by software to achieve the desired bandwidth apportionments for different channels and different service classes.

Refer now to FIG. 8 for an example of four service classes and an eight entry service array in the 64K channel hierarchical bitmap example. This configuration gives 12.5 percent bandwidth granularity. The example of FIG. 8 would give class four 50 percent of the media bandwidth, class one 25 percent, and classes three and four each with 12.5 percent. In the first quantum, a channel from service class four gets access. In the next quantum, a channel from service class one gets access. Then from service class four, two, four, one, four, three, and the cycle then repeats. For each service class, a method such as illustrated in FIG. 5 is used to locate the next channel requiring service. However, the service mask set corresponding to the particular service class is used. Thus, only bit groups within the hierarchical bitmap corresponding to channels within the current service class as indicated by the service array are examined to locate the next channel to be serviced.

Figure 9:
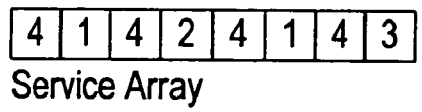
FIG. 9 shows an illustration of service class bitmaps for a four service class example.

FIG. 9 shows an illustration of service class bitmaps for a four service class example. As shown in the example of FIG. 9, the first two channel sections (channel number 1–2,048) are assigned to service class one. The next six channel sections are assigned to service class two. The next four are assigned to class three, and the last channel section is assigned to service class four. As can be seen from the example of FIG. 9, not all channels need be assigned to a service class, e.g., if those channels will not be used. Also, note that the service class bitmaps need not be contiguous. For example, channel sections 64 and 63 could be assigned to the same service class as channel sections 3–8. Also, note that the same bits may be set in different service class bitmaps so that the same channel sections may be assigned to more than one service class. For instance, it may be desirable to make channels 1–1,024 a member of every class, giving those channels equal access to all the channel bandwidth. This may be useful for channels that don't require much bandwidth but need to limit service latency. In such applications, certain channels may limit their bandwidth needs at the source and thus may not require a large amount of bandwidth. However, when access is needed, by being a member of every service class, such a channel may be provided quicker access to the communication media (e.g. reducing send jitter) when they need it.

In a preferred embodiment if a given service class does not have any channels with a pending request then the next entry in the service array is visited immediately. In the example described above, channels are divided into 1,024 channel sections at the top level of the hierarchical bitmap and thus assigned to service classes 1,024 channels at a time. If a finer granularity than 1,024 channels is desired for service class grouping, then the structure of the hierarchical bitmap may be changed. For example, for a 64K channel architecture, the level one bitmap may be 128 bits mapping to 16-bit groups at level two which map to 32-bit groups at level three. This would provide a granularity of 512 channel queues for being divided into service classes.

The hierarchical bitmap method for servicing multiple communication channels may be applied to virtually any application in which multiple communication channels share a limited bandwidth. For example, the hierarchical bitmap mechanism may be implemented in a system such as illustrated in FIGS. 1 and/or 2. The hierarchical bitmap mechanism may be implemented largely in software. In one embodiment a host channel adapter is configured to implement the hierarchical bitmap. As discussed above, higher levels of the bitmap may be implemented in registers within a host adapter integrated circuit and the larger levels of the bitmap may be implemented in a dedicated memory or a system memory. Service masks and service class masks may be implemented as registers within such an integrated circuit. Various channel requests queues may also be supported in the host adapter integrated circuit. Channel service logic may be included to determine the next channel to be serviced as described above.

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system for servicing a plurality of communication channels, comprising:
   a host adapter configured to service communication requests from communication requesters to communication targets, wherein said host adapter provides for up to a maximum number of communication channels to service the communication requests;
   a communication fabric configured to provide a limited bandwidth to said host adapter to service said communication requests, wherein said communication fabric couples said communication targets to said host adapter;
   a first memory configured to store a lowest level of a hierarchical channel map, wherein said lowest level comprises, for each communication channel supported by said host adapter, one bit dedicated only for a corresponding communication channel to which it is mapped, wherein each bit of said lowest level is set to indicate that the communication channel to which it is mapped has a pending communication request and is cleared if the communication channel to which it is mapped does not have a pending communication request;

a second memory configured to store a top level of the hierarchical channel map, wherein each bit of said top level maps to a section of said lowest level, wherein each bit of said top level is set if at least one bit in the section of said lowest level to which it is mapped is set and is cleared if none of the bits in the section of said lowest level to which it is mapped are set;

wherein said host adapter is configured to determine a next channel to be serviced by examining said hierarchical channel map.

2. The system as recited in claim 1, wherein said hierarchical channel map further comprises one or more intermediate levels, wherein each intermediate level comprises a plurality of bits, each one mapping to a group of bits in the next lower intermediate level, wherein each bit indicates if at least one bit in the group to which it maps is set, wherein a highest intermediate level comprises groups of bits mapped to individual one of the bits of said top level, and wherein a lowest intermediate level comprises bits each mapping to one of the groups of said lowest level of the hierarchical channel map.

3. The system as recited in claim 2, wherein said host adapter is configured to examine one group of bits at one or more levels of the hierarchical channel map to identify a next channel to be serviced.

4. The system as recited in claim 3, further comprising a service mask for each level of the hierarchical channel map, wherein each intermediate level service mask indicates the next bit position to be examined within a selected group of bits to determine a selected group of bits to be examined at the next level, wherein the service mask for the lowest level indicates the next bit position to be examined within a selected group to determine the next channel with a pending request to be serviced.

5. The system as recited in claim 4, wherein said host adapter is configured to service each pending communication request for one service unit before moving on to a next pending communication request, wherein the next pending communication request is determined by examining a current selected group in said hierarchical channel map for the next set bit in order from a position indicated by the corresponding service mask.

6. The system as recited in claim 5, wherein said one service unit is less than a maximum message size for the communication requests.

7. The system as recited in claim 1, wherein said first memory and said second memory are part of a memory block accessible by said host adapter.

8. The system as recited in claim 1, wherein said second memory is a register comprised within an integrated circuit with said host adapter.

9. The system as recited in claim 1, further comprising a plurality of service class masks, wherein each service class mask is configured to map a number of said communication channels to one of a plurality of service classes, wherein each service class is allocated a portion of said limited bandwidth on said communication fabric.

10. The system as recited in claim 9, further comprising a service array comprising a plurality of entries, wherein each entry indicates one of said service classes to be serviced during a current service unit, wherein said service classes are selected in order according to said entries in said service array, wherein the order is repeated, and wherein the next channel to be serviced is selected from the current service class.

11. The system as recited in claim 10, further comprising for each service class a service mask for each level of the hierarchical channel map, wherein when its corresponding service class is being serviced each service mask indicates the next bit position to be examined within a selected group of bits to determine a selected group of bits to be examined at the next level, except wherein the service mask for the lowest level indicates the next bit position to be examined within a selected group to determine the next channel with a pending request to be services.

12. A method for servicing a plurality of communication channels, comprising:
for a first service time:
selecting a set bit in a top level of a hierarchical channel map, wherein the set bit in the top level indicates a group of bits in a next level of the hierarchical channel map to examine;
examining in each of one or more intermediate levels of the hierarchical channel map only a group of bits indicated by the set bit selected in the previous level and selecting a set bit from each examined group, wherein said top level is the previous level for a first intermediate level;
examining in a lowest level of the hierarchical channel map only a group of bits indicated by the previous intermediate level and selecting a set bit from the examined group of the lowest level, wherein the selected bit at the lowest level indicates one of the plurality of communication channels to be serviced; and
servicing a communication request from the communication channel indicated by the selected bit from the lowest level of the hierarchical channel map.

13. The method as recited in claim 12, further comprising:
for subsequent service times:
selecting the next set bit from the group of bits in the lowest level from which the previous set bit was selected, or if no more bits are set in that group, selecting the next set bit from the next higher level in the same group as the previous selected bit at that level or repeating said selecting the next set bit from the next higher level until a set bit is found and then selecting a set bit from each group at each lower level as indicated by the set bit at the previous level; and
servicing subsequent communication requests during each subsequent communication time from the communication channel indicated by the selected bit from the lowest level of the hierarchical channel map for each subsequent service time.

14. The method as recited in claim 12, further comprising:
setting a bit in the lowest level of the hierarchical channel map for each communication channel that has a pending communication request; and
setting a bit at each higher level of the hierarchical channel map to indicate that a corresponding group of bits in the next lower level has at least one set bit.

15. The method as recited in claim 12, further comprising updating a service mask for each level of the hierarchical channel map to indicate the position of the last selected set bit within the indicated group of bits, wherein each time an indicated group of bits is examined to select the next set bit, it is examined starting at the next bit position from the position indicated by the corresponding service mask.

16. The method as recited in claim 13, wherein each bit position of the top level of the hierarchical channel map represents a different section of the plurality of communication channels, the method further comprising:
- mapping each section of communication channels to a different service class;
- indicating in a service array an order in which each service class is to be serviced;
- choosing a service class according to said service array; and
- examining only portions of the hierarchical channel map corresponding to sections of communication channels mapped to the chosen service class to select the next set bit at the lowest level.

17. The method as recited in claim 16, further comprising updating a service mask for each level of the hierarchical channel map and for each service class to indicate the position of the last selected set bit within the indicated group of bits and for the corresponding service class, wherein each time an indicated group of bits is examined to select the next set bit, it is examined starting at the next bit position from the position indicated by the corresponding service mask for the current service class.

18. A system for servicing communication queues, comprising:
- memory configured to store a hierarchical channel map comprising a plurality of levels, wherein for each of a plurality of communication channels, each bit of the lowest level is dedicated only for a corresponding communication channel to which it is mapped, and wherein each bit of each higher level is mapped to a group of bits at the next lower level;
- a host adapter configured to maintain the hierarchical channel map, wherein each bit at the lowest level is set if the channel to which it is mapped has a pending communication request and is cleared if not, and wherein each bit of each higher level is set if at least one bit is set in the lower level group to which it is mapped and is cleared if not; and
- wherein said host adapter is configured to examine the hierarchical channel map to determine a next one of the communication channels to service.

19. The system as recited in claim 18, wherein said host adapter is configured to service for one service unit a channel request from a channel mapped to a set bit at the lowest level of the hierarchical channel map, wherein the set bit is selected by examining a current group of bits at the lowest level of the hierarchical channel map to select a next set bit in that group indicating a channel with a pending request, and if no more bits are set in the current group, examining a current group at the next higher level to select a next set bit and then examining the next lower level group indicated by the selected higher level set bit.

20. The system as recited in claim 19, further comprising a service mask for each level of the hierarchical channel map, wherein each service mask is configured to indicate the next bit position in the current group to be examined for a set bit.

21. The system as recited in claim 20, wherein each service mask is configured to indicate the bit position within the current group for the corresponding level of the last selected set bit in that group, wherein the host adapter is configured to examine each group for the next set bit after the bit position indicated by the corresponding service mask.

22. The system as recited in claim 18, wherein each group of bits at one level of the hierarchical channel map has the same number of bits.

23. The system as recited in claim 18, wherein each group of bits at the lowest level is accessible by a single memory access.

24. The system as recited in claim 18, wherein the top level of the hierarchical channel map is stored within a register comprised within the same integrated circuit as said host adapter.

25. The system as recited in claim 18, wherein said host adapter is configured to service channel requests according to service classes, wherein each channel is mapped to one or more service classes, and wherein the next channel to be serviced is selected by examining only portions of said hierarchical channel map corresponding to channels mapped to a current service class.

26. The system as recited in claim 25, wherein the current service class is selected according to an order of service classes indicated by a service array.

27. The system as recited in claim 25, further comprising one service mask per level of the hierarchical channel map per service class, wherein each service mask is configured to indicate the next bit position in the current group to be examined for a set bit when the corresponding service class is the current service class.

28. The system as recited in claim 19, wherein said one service unit is smaller than a maximum message size for the channel requests.

29. A computer readable medium comprising program instructions, wherein said program instructions are operable to:
- select a first bit set in a current top level group of a hierarchical channel map after a position indicated by a top level service mask;
- set the top level service mask to indicate the position of the selected first set bit in the current top level group;
- in a second level of the hierarchical channel map, access a second level group indicated by the selected set bit from the top level;
- select a first bit set in the accessed second level group after a position indicated by a second level service mask;
- set the second level service mask to indicate the position of the selected bit in the accessed second level group;
- in a bottom level of the hierarchical channel map, access a bottom level group indicated by the selected set bit from the second level;
- select a first bit set in the accessed bottom level group after a position indicated by a bottom level service mask;
- set the bottom level service mask to indicate the position of the selected bit in the accessed bottom level group; and
- service a request from a channel indicated by the selected set bit from the bottom level.

30. A method for servicing a plurality of communication channels, comprising:
- for a first service time, examining a top level of a hierarchical channel map to select a section of the communication channels in which at least one channel has a pending communication request, wherein said top level indicates for each of a plurality of sections of the communication channels if at least one channel of that section has a pending communication request;
- for said first service time, examining a portion of one or more intermediate levels of the hierarchical channel map to select a lowest level group of the communication channels in which at least one channel has a pending communication request, wherein each intermediate level indicates for each of a plurality of groups of the communication channels if at least one channel of that group has a pending communication request, wherein the groups at each intermediate level are sized smaller than at the previous intermediate level, and wherein examining a portion of each intermediate level determines which portion of the next hierarchical channel map level to examine; and selecting a next communication channel to be serviced from the lowest level group selected by said examining a portion of one or more intermediate levels.

31. A system for servicing a plurality of communication channels, comprising:

a first memory configured to store one or more levels of a hierarchical channel map, wherein said one or more levels comprises a lowest level for storing an indication of which ones of the plurality of communication channels have pending communication requests;

a second memory configured to store a top level of said hierarchical channel map, wherein the plurality of communication channels are organized in channel sections, and wherein for each channel section said top level indicates if at least one of the communication channels within that section has a pending communication request; and a host adapter configured to determine a next channel to service by examining said lowest level in said first memory, wherein said host adapter determines the next channel to service by examining no more of said lowest level than a portion of said lowest level corresponding to one of said channel sections indicated by said top level as having at least one pending communication request.

32. The system as recited in claim 31, wherein said one or more levels stored in said first memory further comprises an intermediate level of said hierarchical channel map, wherein said communication channels are further organized into channel groups, wherein for each channel group said intermediate level indicates if at least one of the communication channels within that group has a pending communication request, and wherein said host adapter is further configured to determine the next channel to service by examining no more of said lowest level than a portion of said lowest level corresponding to one of said channel groups indicated by said intermediate level as having at least one pending communication request, wherein each channel section includes a plurality of channel groups.

33. The system as recited in claim 32, wherein said top level stored in said second memory is further configured to indicate which portions of said intermediate level contain at least one indication that at least one channel within one of said channel groups has a pending communication request.

34. The system as recited in claim 31, wherein said lowest level comprises a plurality of low level bits, wherein each low level bit is set if a corresponding one of said plurality of channels has a pending communication request and is cleared if the corresponding one of said plurality of channels does not have a pending communication request.

35. The system as recited in claim 34, wherein said one or more levels stored in said first memory further comprises an intermediate level comprising a plurality of intermediate level bits, wherein each intermediate level bit corresponds to a group of low level bits, and wherein each intermediate level bit is set if its corresponding group of low level bits has at least one bit set and is cleared if no bits are set in its corresponding group of low level bits.

36. The system as recited in claim 35, wherein said top level comprises a plurality of top level bits, wherein each top level bit corresponds to a group of intermediate level bits, and wherein each top level bit is set if its corresponding group of intermediate level bits has at least one bit set and is cleared if no bits are set in its corresponding group of intermediate level bits.

37. The system as recited in claim 31, wherein said first memory and said second memory are part of a memory block accessible by said host adapter.

38. The system as recited in claim 31, wherein said second memory is a register comprised within an integrated circuit with said host adapter.

* * * * *